(12) United States Patent
Courtney et al.

(10) Patent No.: US 6,247,647 B1
(45) Date of Patent: Jun. 19, 2001

(54) SCAN PATTERN GENERATOR CONVERTIBLE BETWEEN MULTIPLE AND SINGLE LINE PATTERNS

(75) Inventors: Lisa Courtney, Centereach; Richard Wienecke, East Hampton; Thomas Boehm, Medford; Edward Barkan, Miller Pl.; Paul Dvorkis, Stony Brook, all of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/231,396

(22) Filed: Jan. 13, 1999

Related U.S. Application Data

(63) Continuation-in-part of application No. 08/924,849, filed on Sep. 5, 1997, now Pat. No. 6,102,293, which is a continuation-in-part of application No. 08/381,515, filed on Feb. 1, 1995, now Pat. No. 5,793,032, which is a continuation-in-part of application No. 08/294,845, filed on Aug. 29, 1994, now abandoned, and a continuation-in-part of application No. 08/068,025, filed on May 28, 1993, now abandoned, and a continuation-in-part of application No. 07/884,734, filed on May 15, 1992, now abandoned, and a continuation-in-part of application No. 07/246,382, filed on Sep. 19, 1988, now Pat. No. 5,410,140, which is a continuation of application No. 08/073,995, filed on Jun. 9, 1993, now abandoned, which is a continuation of application No. 07/787,458, filed on Nov. 4, 1991, now abandoned.

(51) Int. Cl.[7] .................... G02B 5/08; G02B 26/00; G06K 7/10
(52) U.S. Cl. .............. 235/462.36; 235/462.38; 235/462.45
(58) Field of Search .............. 235/462.36, 462.37, 235/462.38, 462.39, 462.4, 462.45, 472.01

(56) References Cited

U.S. PATENT DOCUMENTS

| | | | |
|---|---|---|---|
| 5,148,008 | * | 9/1992 | Takenaka ............... 235/455 |
| 5,200,599 | * | 4/1993 | Krichever et al. .......... 235/472 |
| 5,789,730 | * | 8/1998 | Rockstein et al. ......... 235/472 |
| 5,796,091 | * | 8/1998 | Schmidt et al. ........... 235/472 |

* cited by examiner

Primary Examiner—Karl D. Frech
(74) Attorney, Agent, or Firm—Kirschstein, et al.

(57) ABSTRACT

An arrangement for and a method of reading bar code symbols on a target to move a light beam emitted by a light source in a multiple line, scan pattern during a scan period in a first operational mode. Upon selection of a second operational mode by a user, a controller intermittently operates and energizes the light source to emit the light beam for a working time period which is less than, and a fraction of, the scan period to generate a single scan line across the symbol.

20 Claims, 16 Drawing Sheets

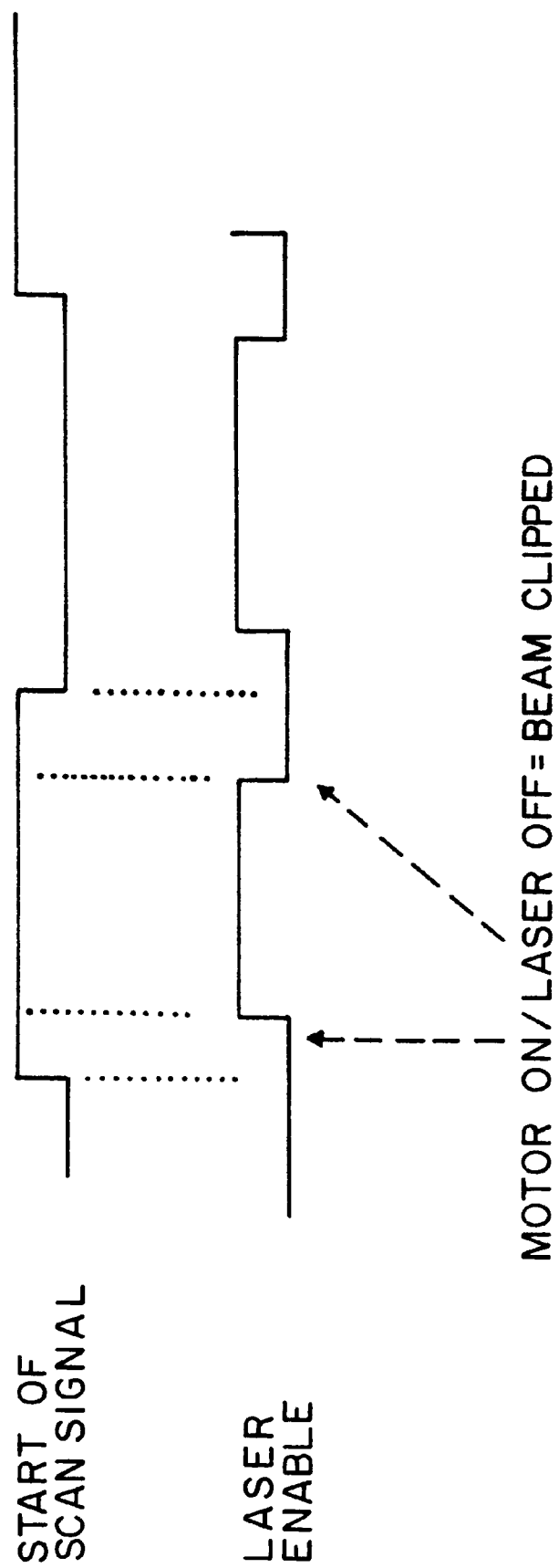

SCAN PATTERN GENERATOR CONVERTIBLE BETWEEN MULTIPLE AND SINGLE LINE PATTERNS

CROSS REFERENCE TO RELATED APPLICATIONS

This application is a continuation-in-part of U.S. application Ser. No. 08/924,849, filed Sep. 5, 1997, now U.S. Pat. No. 6,102,293, which is a continuation-in-part of U.S. application Ser. No. 08/381,515, filed Feb. 1, 1995, now U.S. Pat. No. 5,793,032, which is a continuation-in-part of U.S. application Ser. No. 08/294,845, filed Aug. 29, 1994, abandoned; a continuation-in-part of U.S. application Ser. No. 08/068,025, filed May 28, 1993, now abandoned; a continuation-in-part of U.S. application Ser. No. 07/884,734, filed May 15, 1992, now abandoned, and a continuation-in-part of U.S. application Ser. No. 07/246,382, filed Sep. 19, 1998, now U.S. Pat. No. 5,410,140, which is a continuation of U.S. application Ser. No. 08/073,995, filed Jun. 9, 1993, now abandoned, which is, in turn, a continuation of U.S. application Ser. No. 07/787,458, filed Nov. 4, 1991, now abandoned. This application is also related to U.S. application Ser. No. 08/068,024, filed May 28, 1993, now U.S. Pat. No. 5,416,310, and Ser. No. 08/068,026, filed May 28, 1993, abandoned.

BACKGROUND OF THE INVENTION

1. Field of the Invention

This invention relates to optical scanners for reading indicia of varying light reflectivity, and in particular to minimizing power usage and improving the aiming of such scanners.

2. Description of the Related Art

Various optical readers and optical scanning systems have been developed heretofore for reading indicia such as bar code symbols appearing on the label or on the surface of an article.

The symbol itself is a coded pattern of indicia comprised of, for example, a series of bars of various widths spaced apart from one another so bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and utilized as an input to a data processing system for applications in point-of-sale processing, inventory control and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application. As disclosed in the above patents, one embodiment of such scanning systems includes, inter alia, a hand held, portable laser scanning device supported by a user, which is configured to allow the user to aim the scanning head of the device, and more particularly, a light beam, at a targeted symbol to be read.

Such prior art hand held devices generally incorporate a light-receiving module which receives the light that has been reflected from the bar code symbol and determines, from the reflected pattern, the sequences of bars and spaces within the symbol. The unit may also incorporate decoding circuitry to decode the received information and to recover the underlying data (for example the alphanumeric data) which the bar code symbol represents.

It may in some circumstances be disadvantageous for the light generating and emitting module to be housed within the same unit as the light-receiving module and the decoding circuitry. In the first place, locating everything within the main housing requires that the bar code to be read is positioned so that most or at least a substantial proportion of the reflected light returns to the unit along the same path as the emitted light. It might not always be convenient for a user to position the bar code reading and/or the bar code so that the light is reflected back along the same path in that way. Secondly, locating everything within the same unit means that the unit has to be physically rather large and relatively heavy. Users may not find it easy to operate for long periods.

In the field of laser pointers, it is known to provide small hand held units which users can use at conferences, seminars or the like for pointing purposes. The visible spot of the laser beam, when shone onto a screen, indicates to the audience the point of interest, and enables the lecturer to dispense with the traditional physical pointer. Although modern laser pointers are relatively small and compact, they nevertheless still have to be grasped in the hand of the lecturer, which naturally restricts the lecturer's user of that particular hand. Typically, the laser pointer has to be put down every time the lecturer wishes to do something else, such as to turn over a page in his or her notes, or to operate an overhead projector.

SUMMARY OF THE INVENTION

According to a first aspect of the present invention there is provided an optical system for and a method of reading bar code symbols on a target by moving a laser beam directed toward the target in a scan across the symbol during a scan period that commences and ends at opposite scan end-limiting positions, respectively, of the scan. Power usage of the system is minimized by intermittently operating and energizing a light source during the scan period over a duty cycle prior to reading the symbol, to emit the laser beam for a working time period which is less than, and a fraction of, the scan period. The intermittent and cyclical nature of energizing the light source produces multiple images of the light beam on the symbol to visually enhance the aiming of a hand-held scanner at the symbol.

The invention may be carried into practice in a number of ways, and several specific embodiments will now be described, by way of example, with reference to the drawings.

BRIEF DESCRIPTION OF THE DRAWINGS

FIG. 10 shows a storage box for use with the portable optical scan system of FIG. 1a;

FIG. 12d is a timing diagram of another embodiment of the laser beam pulsing pattern;

DESCRIPTION OF THE PREFERRED EMBODIMENTS

Figure 1A:
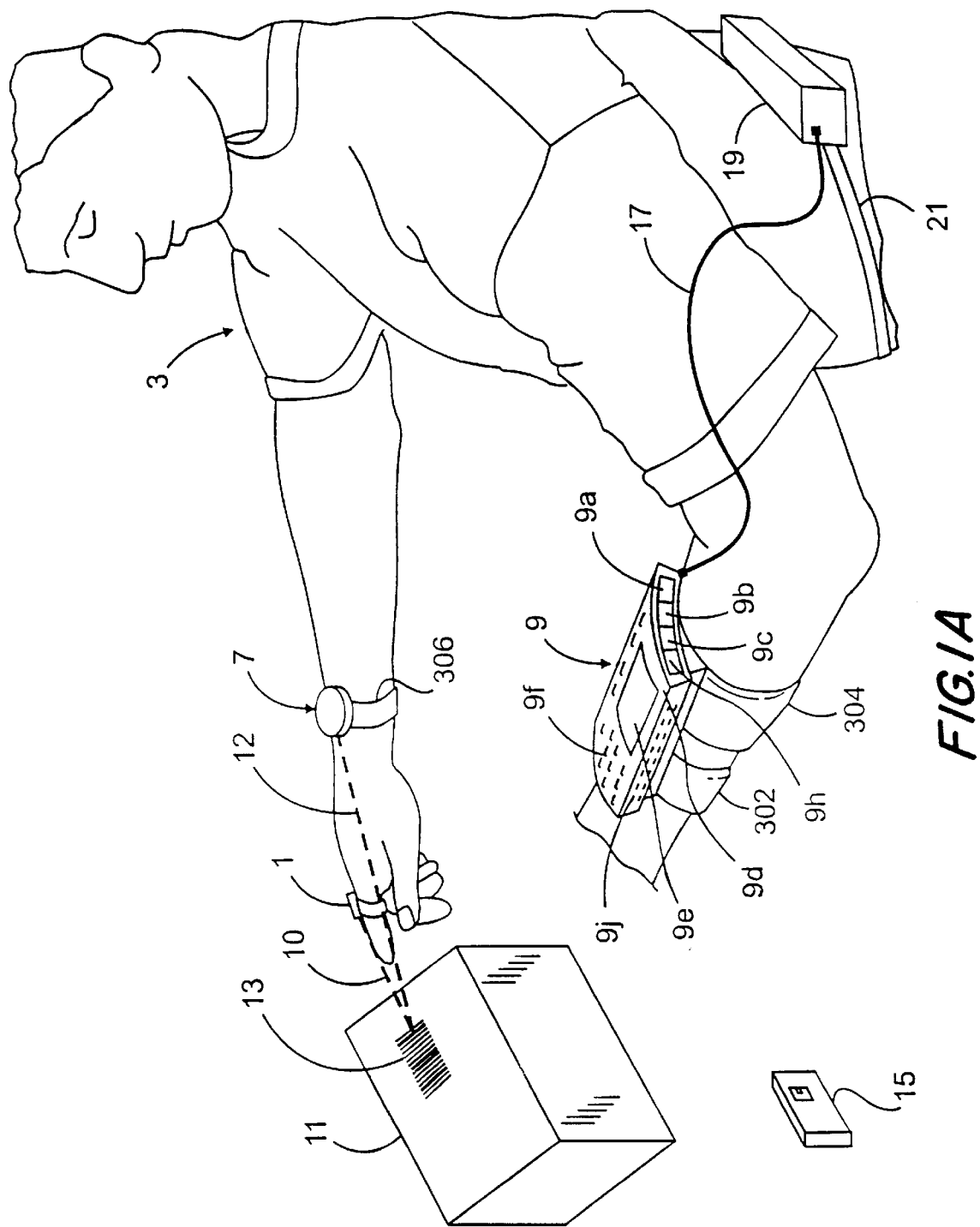
FIGS. 1a and 1b depict a portable optical scan system in accordance with a first embodiment of the present invention.

FIG. 1A shows a portable optical scan system in accordance with a first embodiment of the present invention. An optical scan module 1 is detachably mounted on a single finger of a user 3 using a ring-shaped mounting. The detachable mounting may be of any number of conventional types suitably adapted for its ease of use for the desired application. For example, a ball and flexible socket mounting, or a slide mounting could be used. Other mountings with movable restraining members might also be used.

In addition to the optical scan module 1, the user 3 wears a first peripheral module 7, on the wrist, and a second peripheral module 9 on the other arm. As will be clear from the Figure, the scan module 1 emits a scanning laser beam 10 which the user directs towards a bar code symbol 13 to be read. The bar code symbol may be printed on or otherwise attached to an article 11, details of which the user 3 wishes to obtain for example for inventory or for sale purposes. The scanning beam 10 is reflected from the bar code symbol 13, and the reflected light 12 is detected by the first peripheral module 7.

Figure 1B:
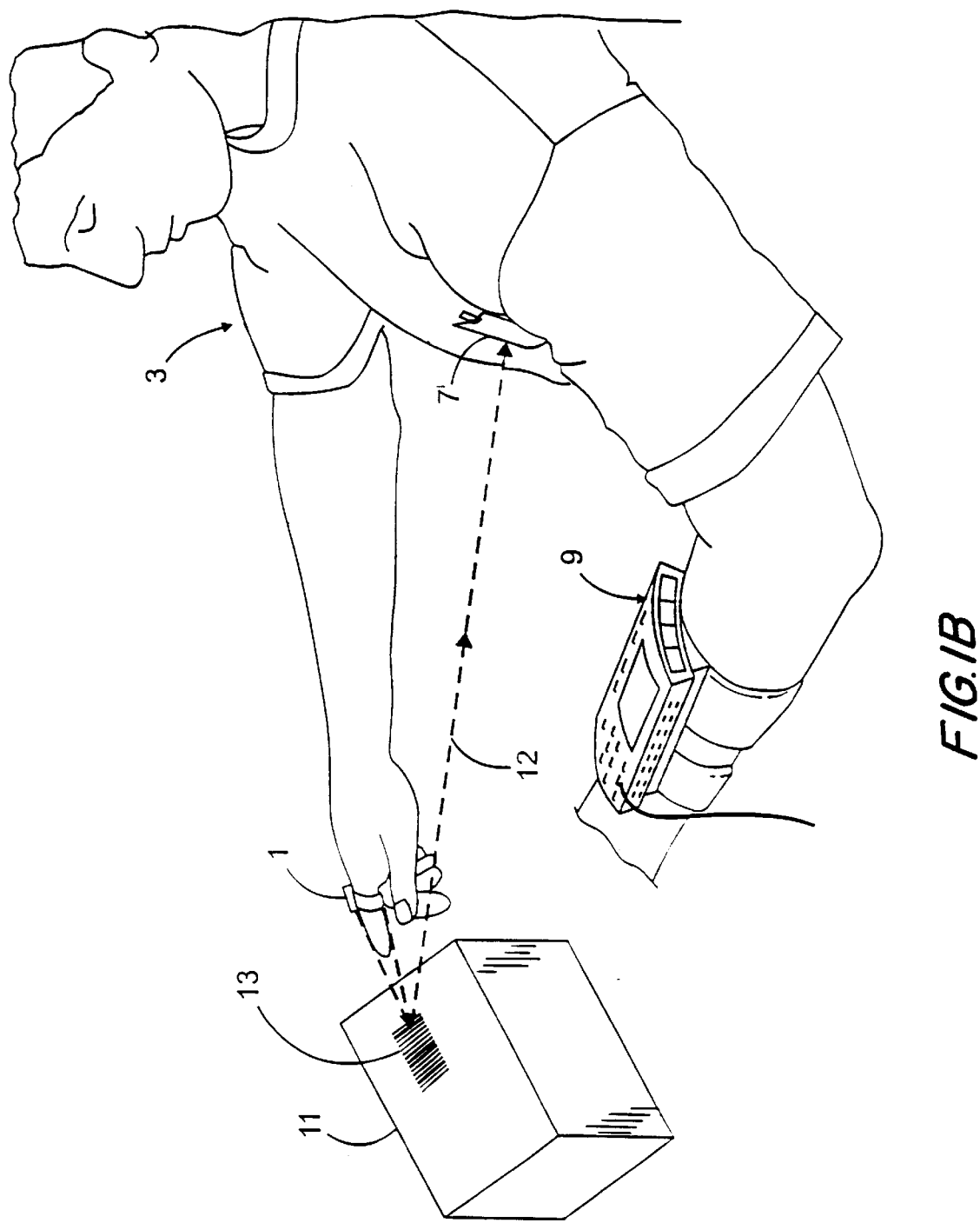

FIG. 1B illustrates a variant of the embodiment of FIG. 1A in which the reflected light 12 returning from the bar code symbol 13 is detected by a peripheral module 7' which is secured to the user's clothing. In the variant shown, the peripheral module comprises a detector which is clipped onto the breast pocket of the user's shirt. Other arrangements (not shown) could of course be envisaged, in which the peripheral module 7' is secured to or forms part of other articles of clothing.

Figure 2:
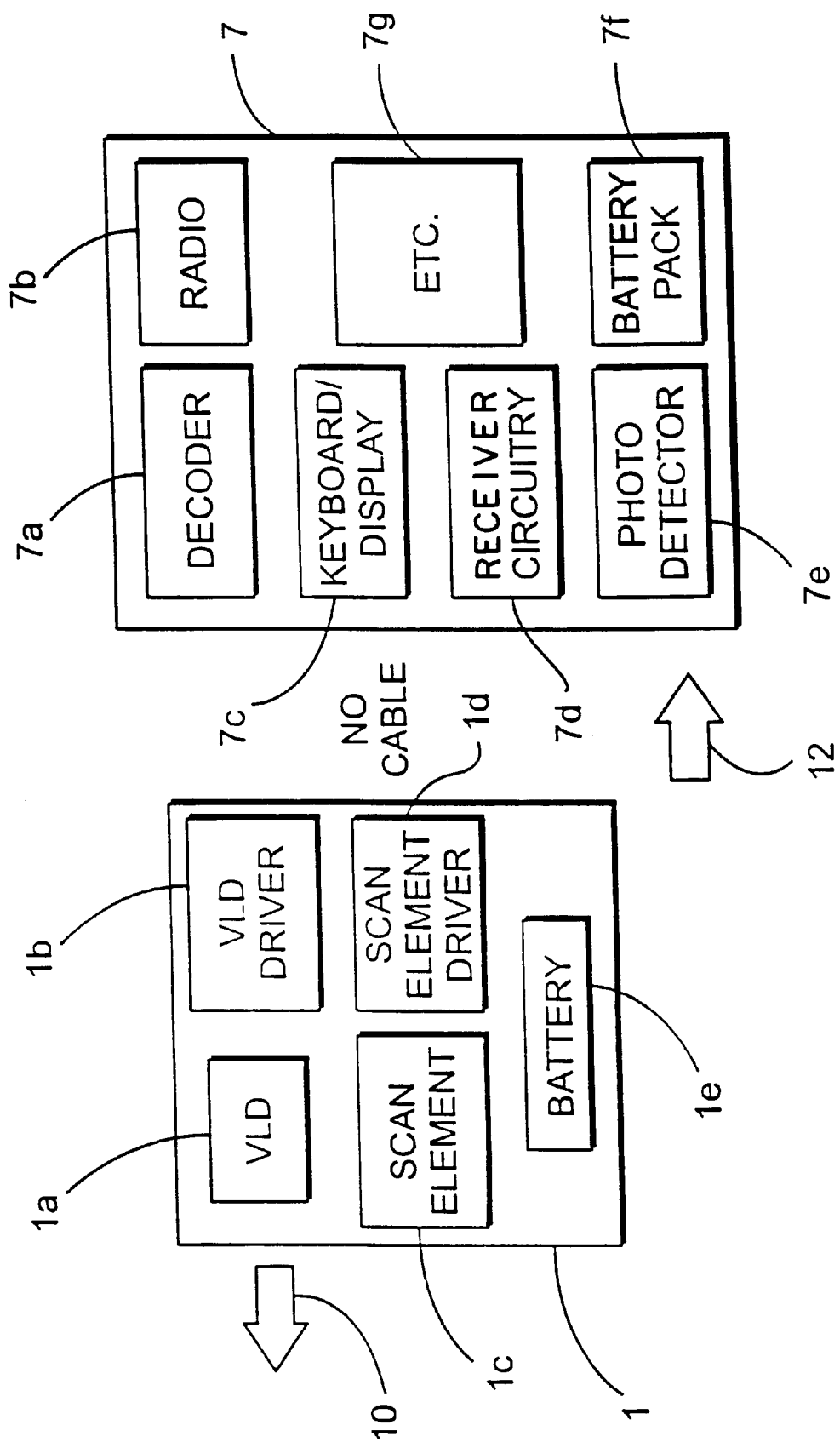
FIG. 2 illustrates schematically the ring unit and the wrist unit shown in FIGS. 1a and 1b.

FIG. 2 illustrates schematically the internal features of the scan module 1 and the first peripheral module 7. The module 1 incorporates a device for generating and scanning the light beam 10, desirably a visible laser diode (VLD) 1a, having a driver 1b. Scanning of the beam 10 is achieved by means of a scan element 1c, and a scan element driver 1d. Power is provided by means of a small battery 1e.

The first peripheral module 7 comprises a photodetector 7e and receiver circuitry 7d which are together arranged to detect the returning light beam 12. The output from the receiver circuitry is passed to a decoder 7a which is arranged to reconstitute the alphanumeric information which the bar code symbol 13 represents. The first peripheral module may also include a keyboard and/or display 7c along with other possible features 7g such as for example a time display so that the module 7 doubles as an ordinary watch when it is not in use as part of the optical scan system. A radio frequency (RF) or other wireless transmitter 7b, along with a battery pack 7f or other power supply completes the unit.

In use, the decoded information emanating from the decoder 7a is passed by wireless link from the radio 7b to the second peripheral module 9 which is located on the other arm or wrist of the user. The radio transmitter 7b could be a transceiver which is also capable of receiving signals from the second peripheral module 9 or from a separate base station 15.

The second peripheral module 9 incorporates a radio receiver 9a and a radio transmitter 9b for communicating with the first module 7 and/or with the base unit 15. Typically, the respective transmission frequencies will be different. The second peripheral module 9 further includes digitizing and processing circuits 9c which convert the transmitted analog signal to a digital signal and decode the signal in a conventional manner. An indicator light, beeper or audio transducer 9d signals the user when the decoding has been satisfactorily accomplished. Such notice could also or alternatively be provided by information displayed on a display unit 9e. A memory storage device 9h is also preferably included for temporary storage of the decoded data. A keypad 9f and/or touch screen may be used for inputting data to the system. A battery 9j is provided to supply power to the secondary peripheral module. Alternatively, or in addition, power may be supplied via an external lead 17 from a separate power supply 19 which is secured to the body of the user, for example on a belt 21.

Depending upon the preference of the user, the second peripheral module could be worn on the right arm, or wrist, like a watch (and in fact, may function as a watch) and the optical scan module 1 and the first peripheral module on the left arm or wrist. In an alternative embodiment (not shown) the second peripheral module 9 could be dispensed with, with all the features of that unit instead being incorporated within the first peripheral module 7. This would of course be expected to make the first peripheral module much larger than is shown in the drawing.

It will be noted that in the arrangement shown in FIGS. 1A and 1B, there is no cable or other physical connection between the optical scan module 1 and either of the first or second peripheral modules. This improves the wearability of the system, and the likely user acceptance. It is also rather safer, since the lack of wires means that there is less to get caught as the user moves around, perhaps undertaking a variety of different tasks while wearing the devices shown.

Figure 5:
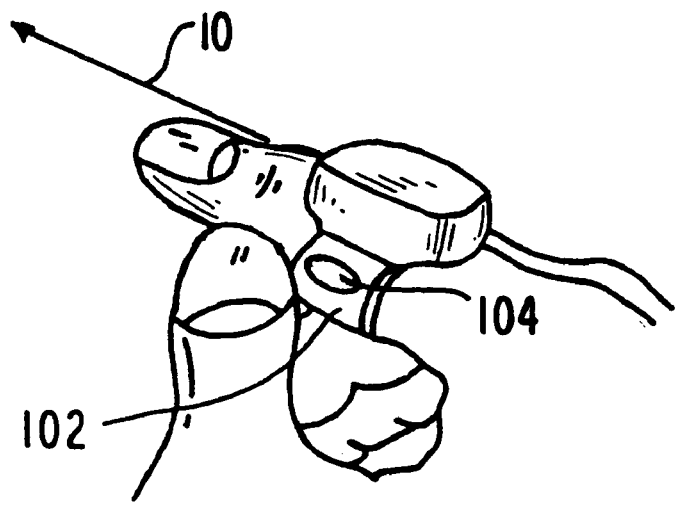
FIG. 5 shows details of the laser pointer of FIG. 4.
Figure 6:
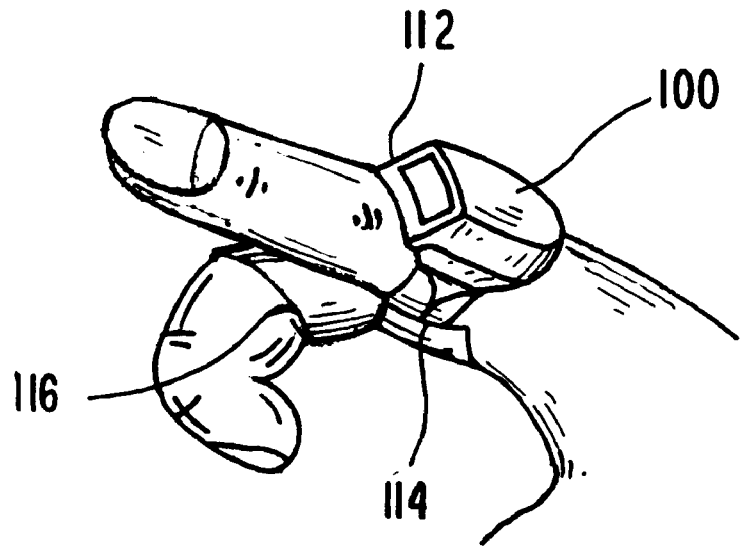
FIG. 6 illustrates the triggering mechanism which may be used with the laser pointer of FIG. 4, or with either of the portable optical scan systems of FIGS. 1a, 1b, or FIG. 3.

In a variation of the embodiment described above, the scan element 1c and the scan element driver 1d may be omitted from the optical scan module 1, so that the beam 10 is essentially a fixed beam. With such an arrangement, the user would then physically move his or her hand or arm, thereby manually scanning the beam 10 across the bar code symbol 13. Such an arrangement has the advantage that the module 1 can be reduced in size and in weight, not only by elimination of the mechanical and electronic scanning features, but also because the battery 1e may substantially be reduced in size. A suitable module for use with this variation is illustrated in FIGS. 5 and 6, which will be described in more detail below.

Figure 3:
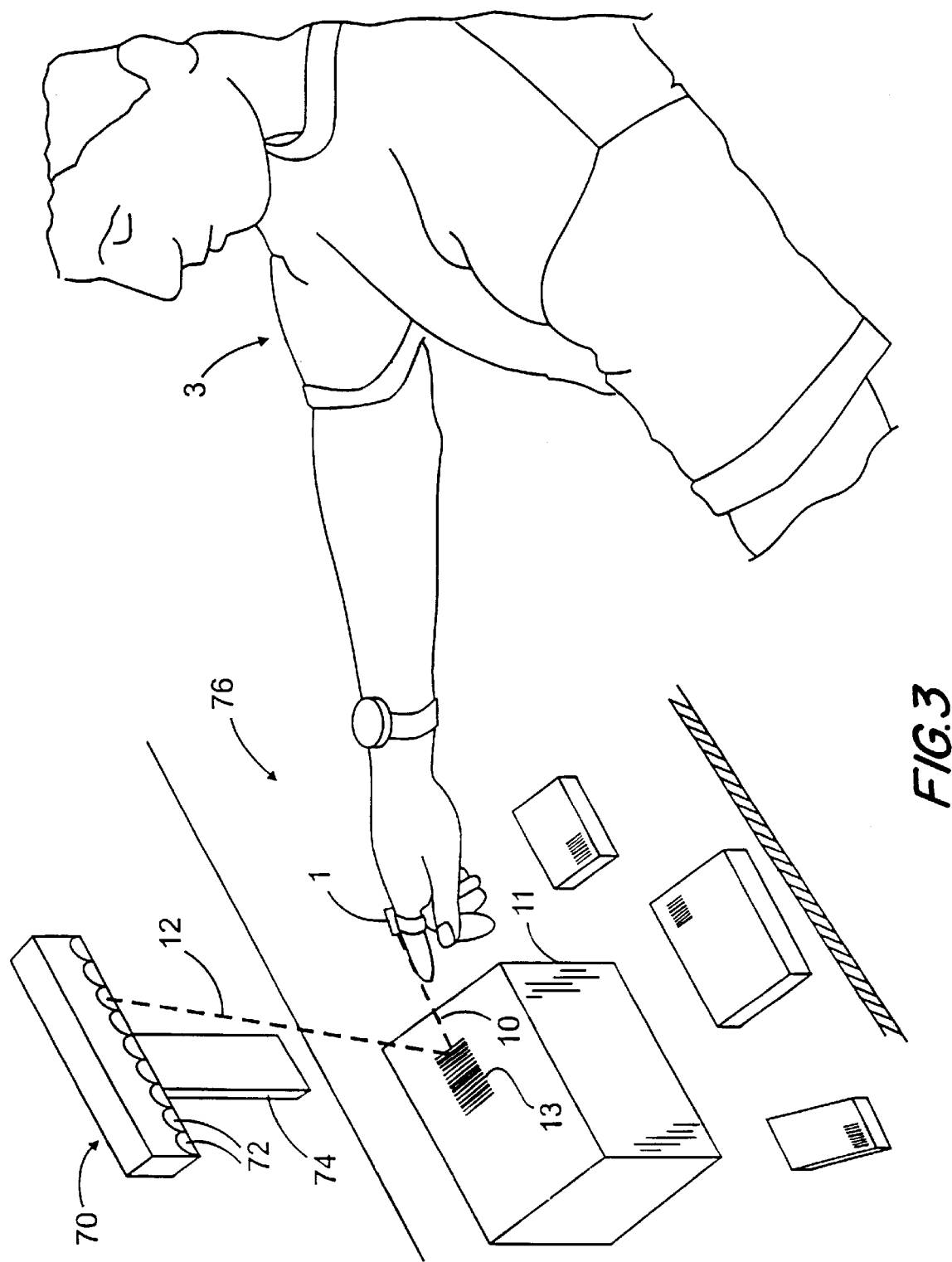
FIG. 3 depicts a portable optical scan system in accordance with a second embodiment of the present invention.

A second embodiment of the second invention is shown schematically in FIG. 3. In this embodiment, the light 12 which is reflected from the bar code symbol 13 is detected by a separate detector unit 70 which comprises a fixed bank of photodetectors 72 which look down onto the surface of the article 11 so as to detect the reflected light. The detector unit could be mounted to a stand 74 which is positioned adjacent a conveyor 76 along which the item 11 is passing. Alternatively, the detector unit 70 could be mounted in or secured to a cash register, could be mounted to the ceiling, or may be suspended from the ceiling by a cable similar to a hanging lamp, or could be mounted within a tunnel which surrounds or at least partially surrounds the conveyor.

In this embodiment, the optical scan module 1 is preferably the same as the scan module illustrated in FIGS. 1 and 2, with or without the scan element 1c and the scan element driver 1d. If these are not provided within the module, the user has to manually scan the beam 10 across the bar code symbol 13 to be read. As a further alternative (not shown) a hand held pointer or hand held scanner could instead be used, but in each case the detectors are fixedly mounted over the scanned surface.

Figure 4:
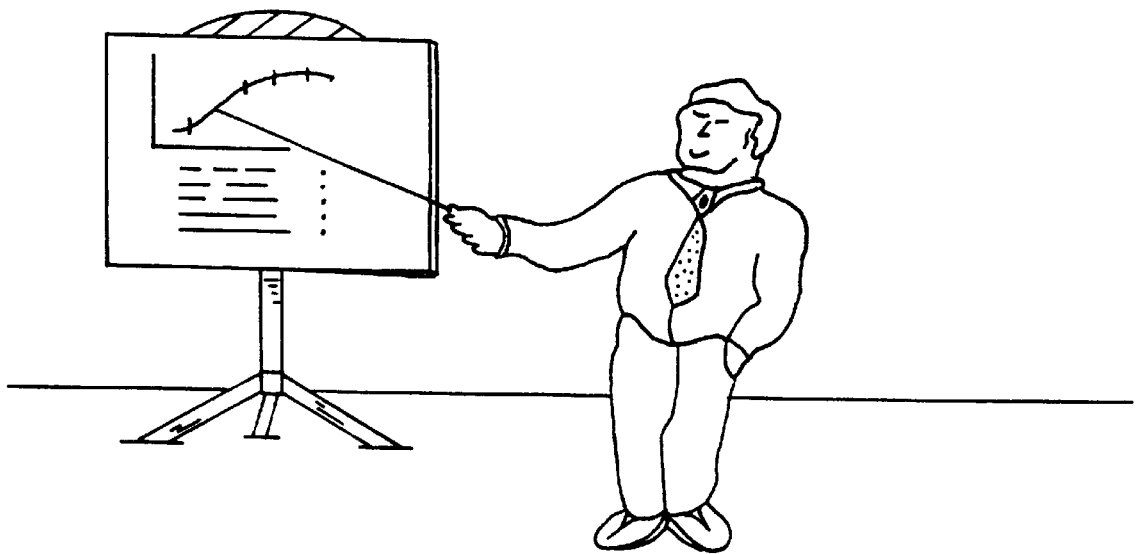
FIG. 4 depicts a laser pointer in accordance with a third embodiment of the present invention.

In those cases in which the optical scan module 1 does not incorporate a beam scanning mechanism, the module 1 effectively becomes a ring-mounted laser pointer. Such a pointer may, as previously described, be used for scanning applications merely by scanning the beam manually across the indicia to be detected, and providing separate detectors elsewhere, either fixedly mounted or secured to the body of the user, which detect the reflected beam. However a laser pointer of this type is not necessarily restricted to scanning applications, and as may be seen from FIG. 4 the laser pointer could instead be used at lectures, seminars, meetings and so on, or indeed at any type of public presentation.

Reference should now be made to FIGS. 5 and 6 which illustrate certain preferred features of the laser pointer. The embodiment shown in FIGS. 5 and 6 is equally applicable both to the application of FIG. 4 and the application of FIGS. 1A, 1B and 2.

The laser pointer 1 comprises a ring or shank portion 102, adapted to be worn on the finger of the user, to which is secured an upper housing portion 100. Within the housing is a battery which provides power to a visible laser diode (VLD) or other light source. The VLD is mounted to a metal holder/heat sink. Light generated from the VLD passes through an optical system comprising a plurality of lenses, out through an exit window 112. The optical system preferably provides that the beam is collimated or at least quasi-collimated. Electronic circuitry is provided which maintains the laser output at a predetermined level, and also acts as a trigger mechanism.

A trigger button 104 is provided on one side of the ring 102, where is can be actuated by the user's thumb. In this way, the user can easily switch the laser beam on and off.

Another alternative and/or additional switching mechanism may be provided by means of a separate ring which is attached to the user's middle finger and which is secured to the ring by means of a cord. As is shown in FIG. 6, the user may operate the device by flexing the middle finger, and so pulling on the cord. This could be done either by bending the middle finger with respect to the index finger, or by pulling the middle finger away from the index finger.

A device of this sort is both easy and convenient for a lecturer to wear, and it also allows free use of the hand at all times. Because the ring is preferably mounted to the index or forefinger, pointing accuracy is likely to be increased.

An alternative and/or additional switching mechanism may be provided by the use of a limited range proximity sensor. Reference is made to U. S. Pat. No. 5,280,162 which is hereby incorporated by reference, as describing "object sensing" or proximity sensing technology in a bar code reader. By appropriate setting of threshold signals in the circuits of such a system, the sensor may be made to trigger by a movement of the thumb, or by a more distant object embodiment of a "self triggering" mode which will be described in connection with FIGS. 11 and 12 in more detail. Another embodiment utilizes a very small range proximity sensor, so that the unit will not be triggered by a distant target, but only the user's thumb. In that embodiment, there is a very limited range proximity embodiment which provides a limited range proximity.

A sensor is located on the front or side surface of the ring 102. When the user wishes to turn the unit on, a slight movement of the thumb closer to the index finger will switch the unit on, thus avoiding the effort required for the thumb to press a trigger switch.

Figure 7:
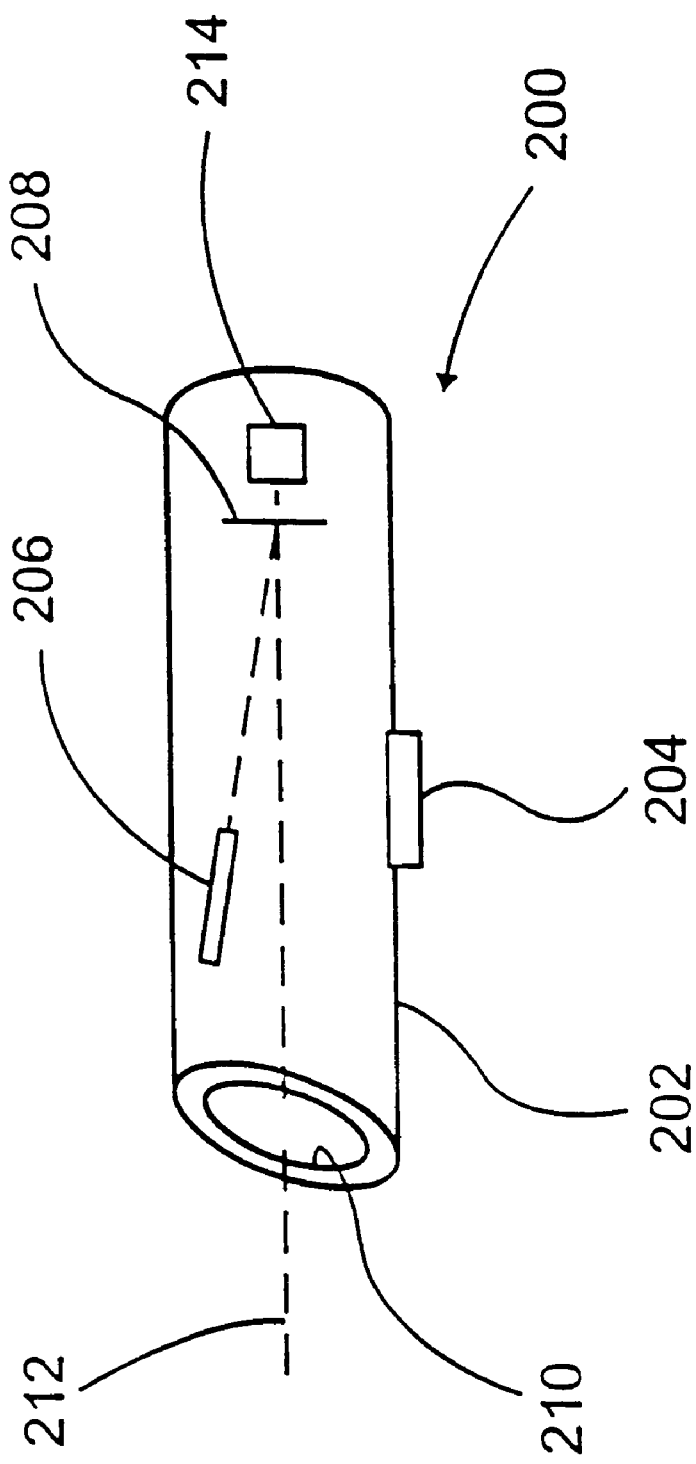
FIG. 7 illustrates a hand-held laser pointer/laser scanner of another embodiment.

FIG. 7 illustrates, schematically, a hand-held laser pointer 200 which is capable either of providing a fixed laser beam, for pointing purposes or a scanning laser beam. Whereas a fixed laser beam generates a point or dot, that can be aimed at a screen, a scanning beam generates a line or a circle. This is especially convenient if the user wishes to underline or to circle a sentence or a figure that is being pointed to.

The pointer shown in FIG. 7 incorporates a hand-held body 202, having a manually actuable multi-positioned switch 204. Inside the body 202 there is a short wavelength VLD (visible laser diode) 206 which directs a beam onto a small, micro-machined mirror 208. This deflects the beam out of a window 210 in the housing, thereby providing a pointing beam 212. A scanning element 214 is provided for selectively oscillating the mirror 208, thereby causing the beam 212 to be scanned.

In a first position of the switch 204, the laser diode 206 is switched off, and no beam is produced. In a second position, the laser diode is switched on and is reflected from the stationary mirror 208, thereby providing a fixed pointing beam 212. In a third position of the switch, the scanning element 214 is actuated, causing the beam 212 to be scanned, thereby generating a visible line on the surface that is being pointed to. In the preferred embodiment, the scanning is in one dimension so that the resultant line on the screen is straight. In an alternative embodiment, however, the scanning element 214 could cause the beam 212 to be scanned in two directions, thereby forming any desired type of lissajous, such as a circle, on the screen. More complex scanning arrangements could also be envisaged, so that for example the image projected onto the screen is a square or other desired figure.

If the trigger 204 is a multi-position trigger, the device could provide a projected straight line in one position of the trigger, and a projected circle in another position. Different positions of the trigger could also provide different lengths of line and/or different sizes of circle or other images that are being projected.

Scanning of the beam 212 of course reduces the visibility of the image with respect to the visibility of the dot generated by a fixed beam. To compensate, the laser output power is increased according to the position of the trigger 204.

Instead of being hand-held, the device shown in FIG. 7 may be built into a ring, and in particular it may be built into any one of the rings that have previously been described. Naturally, in such a case, the trigger 204 will be replaced with an appropriate trigger or switch on the ring itself. For example, if the arrangement of FIG. 7 is built into the ring shown in FIG. 6, the trigger 204 is merely replaced by the trigger button 104 (FIG. 5) or the cord 114 (FIG. 6). It will of course be appreciated that, where appropriate, the button and/or cord may be multi-position. Alternatively (not shown) there may be several separate switches, one of which for example produces a fixed beam and another of which produces a scanning beam.

Batteries for wearable devices of the types which have already been described typically occupy a significant proportion of the device's volume, and additionally contribute to its weight. Where substantial power is required, such as for example the devices illustrated in FIGS. 1 to 3, a separate battery pack 19 is often the most convenient way to provide the power that is needed. However, in a variation of the embodiments previously described, power may instead or in addition be provided by a thin flexible battery which forms part of the band that wraps around the arm, wrist or finger of the user. Specifically, in FIG. 1A the wrist band 306 could be such a battery, as could the arm bands 302 or 304. In FIG. 5, the ring 102 could be a battery.

Preferably, the battery is of the lithium polymer rechargeable type, which is simply cut into the appropriate shape. Such batteries may provide sufficient power, on their own, for operation of some devices; in other cases, they may be used as an auxiliary battery, thereby reducing the size of the additional cells that may be necessary.

Figure 8:
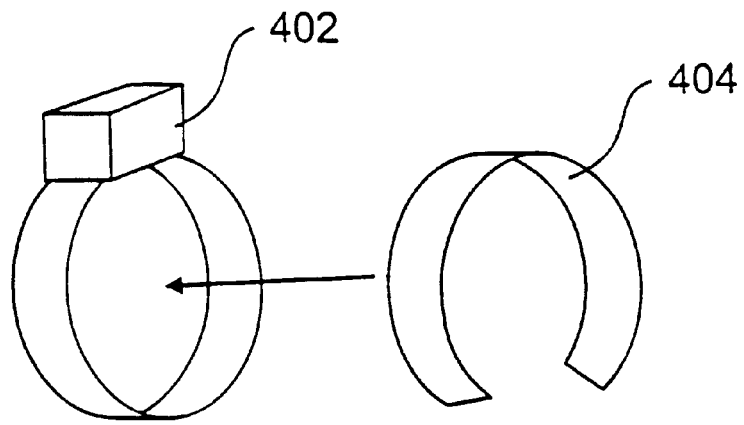
FIG. 8 shows schematically yet a further embodiment in which a band for securing a pointer or scanner to the user's body comprises a flexible battery.

FIG. 8 illustrates the concept in schematic form. A flexible battery strip 404, preferably a lithium polymer battery, is formed into a ring shape and is attached to a scanner and/laser pointer 402. Depending upon the size of the device, the band 404 may fit around a finger, a wrist or an arm of the user.

Figure 9:
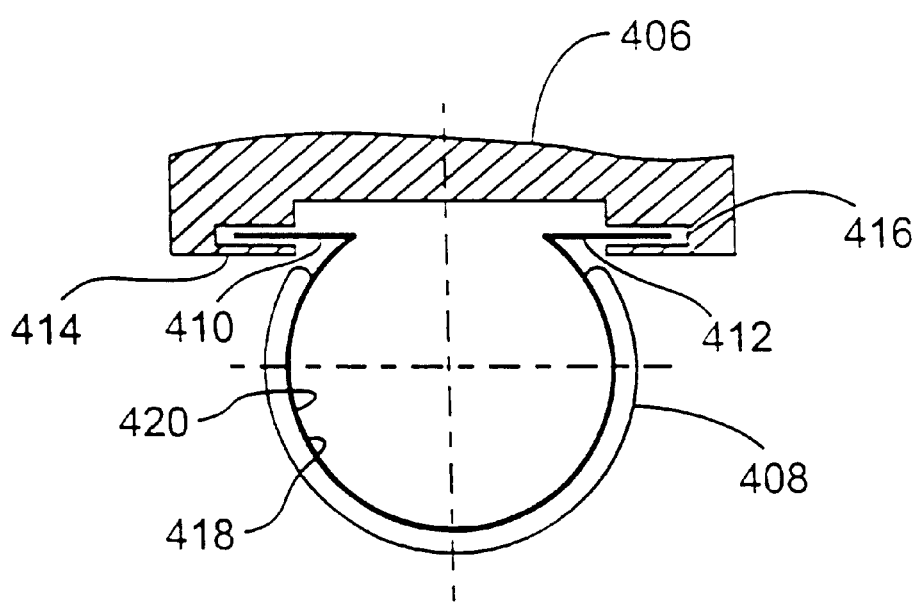
FIG. 9 represents a practical embodiment of the device shown in FIG. 8.

FIG. 9 illustrates a practical embodiment in more detail. A flexible battery strip 408 is attached to two circularly-shaped snap springs 418 and 420. One snap spring 418 is attached to the positive battery terminal, and the other 420 to the negative battery terminal. At one end of the spring 418 there is a contact portion 410, while at the opposite end of the other spring 420 there is a similar contact portion 412. These fit into corresponding grooves 414 and 416 in the lower surface of the scanner/laser pointer 406, thereby providing the necessary electrical power.

The exact shape and configuration of the battery and the contacts is not of course critical. In the embodiment shown in FIG. 9, the springs 418 and 420 could be in the form of thin, sprung wires. Alternatively, they could take the form of flat leaf springs, which extend out of the plane of the diagram. In the first case, the scanner/laser pointer 406 is provided with sockets 414 and 416 in the form of blind bores which receive the contact portions 410 and 412. Alternatively, where the springs take the form of leaf springs, the contact portions 410 and 412 may simply be slid into appropriate grooves 414 and 416 in a direction perpendicular to the plane of the figure. In either case, the snap springs 418 and 412 are preferably incorporated within the plastic protective jacket of the battery during the manufacturing process.

To make it easier to put the device on and to take it off, an alternative embodiment (not shown) provides for one end of the battery to be hinged to the underside of the scanner/laser pointer. The other end is secured by an easily-releasable clasp. To put the device on, or to take it off, the user merely releases the clasp and hinges the battery away from the underside of the scanner/laser pointer.

Figure 10:
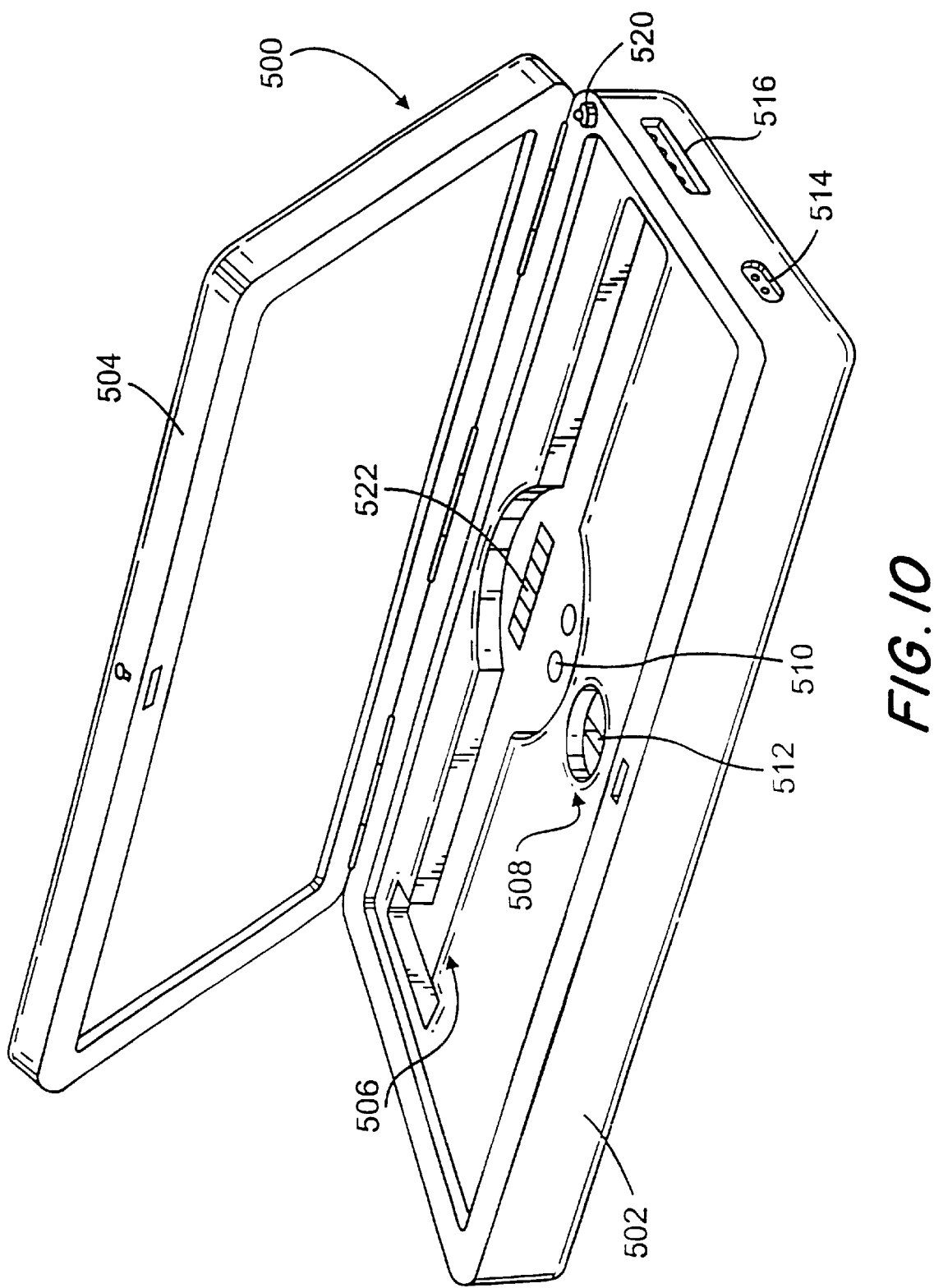

FIG. 10 shows a storage box 500 which is suitable for use with the system shown in FIG. 1A. The box comprises a base portion 502 and a lockable hinged lid portion 504. Within the base portion 502 there is a first recess 506 for storing the watch 7 (FIG. 1A) and a second recess 508 for storing the ring 1 (also FIG. 1A). In addition to providing convenient and secure storage, the box 500 incorporates a battery charger (not shown) to recharge any battery that may be incorporated within the watch 7 and/or the ring 1. To that end, when the watch is placed within the recess 506, its rear surface comes into contact with electrodes 510. Likewise, when the ring is placed in the recess 508, with the band portion pushed down into a slot 512, it comes into contact with further electrodes (not shown). Power is provided to these electrodes via a main supply which is plugged into a socket 514 on the outside of the box. The electrodes become live, thereby recharging the batteries (for example overnight) when the lid 504 is closed, thereby closing a microswitch 520.

In some embodiments, the watch 7 of FIG. 1A may be used to store data, and may accordingly have a memory chip inside it. When the watch is placed in the recess 506, an electrical contact on its rear surface abuts a corresponding contact 522 at the base of the recess. The data within the watch may then automatically be downloaded, or downloaded on request, via a data socket 516 to an external computer (not shown).

Self Triggering Mode

Another key feature of the present invention is to implement a variety of adaptable "self triggering" or "object sensing" modes of operation that eliminate the need for a manual trigger switch, and also optimize the turning on of the scanning and bar code reading operation for different ergonomic implementations—fixed mount, hand-held (including hand-supported), ring or finger-mounted, body mounted, etc., all of which may require different "turn on" conditions for the user applications envisioned. Reference is first made to U.S. Pat. No. 5,280,162 of the present assignee for background information describing a scanning system operable in a "sleep" mode including object sensing, and a "scanning" mode after sensing an object in the scanning field.

Another prior art design uses an infrared LED which is blinking at a high frequency. A photo detector is connected to analog circuitry that responds to signals at the frequency at which the LED is blinking. When an object with a bar code is placed in front of the scanner, some infrared light is reflected back to the detector. The circuit responds to this by sending a "Trigger" signal to the decoder, which initiates scanning.

Such prior art systems have several drawbacks. The signal detector circuitry adds costs and complexity to the scanner. The LED also consumes power, which is a drawback in battery powered applications. The sensing range varies depending on the size and color of the object being sensed, and it is subject to false triggering which can cause accidental reading and wastes power.

In other prior art self-triggering designs, the laser is turned on for one scan and off for three scans. If during the scan with the laser turned on something resembling a bar code is detected somewhere in the scan field, the laser stays on until either a symbol is decoded or a predetermined time has elapsed. The scanner then resumes blinking the laser.

This is an improvement over the other prior art design since it adds no additional circuitry to the scanner. It is less likely to false trigger because it only turns on when real bar codes or at least things that look like bar codes are detected, and its range inherently matches the range of the scanner, regardless of the size and color of the item being scanned.

However, the blinking laser is visually annoying to some users. Sensing can be sluggish because it can take as much as three scan periods to detect an object, because the scanner cannot sense symbols when the laser is off. Accidental reads are still possible because it can sense a symbol anywhere along a wide scan line. Power is still consumed by the laser when it is turned on, and by the decoder which performs a control and monitoring function, and which therefore must be kept turned on to control the blinking and sensing.

Still another prior art design has the laser turned on all the time. Such design is usually not commercially useful since it would too rapidly use up the laser's limited life. It would also heat up the laser and the interior of the scanner housing which would further shorten the laser's life. It would also use a substantial amount of power. Except for the decoder, the laser uses more power than any other component of a hand-held scanning item.

The blinking laser mode is only practical with a very long lived motor, as it requires the motors to run continuously. These motors will not wear out and use so little power that they do not heat up the interior of the scanner.

It has been determined from experimental measurements that blinking the laser on for one out of four scans keeps it cool enough that its lifetime will be satisfactorily long, assuming adequate heat sinking and minimum heat generation by other circuitry.

The present invention provides a way to have the laser turned on only 25% of the time by turning it on every scan, but only for 25% of the scan period. In scanners that run typically at thirty-six scans per second, each scan takes 27.7 milliseconds, so if the laser is turned on for only 6.9 milliseconds in each scan, it will be on 25% of the time. The laser will then have the same lifetime as it would in a scanner that turns the laser on for one out of four scans. The figure 25% is chosen as an example in our discussion, but may be any appropriate percentage of the particular application envisioned.

Figure 11A:
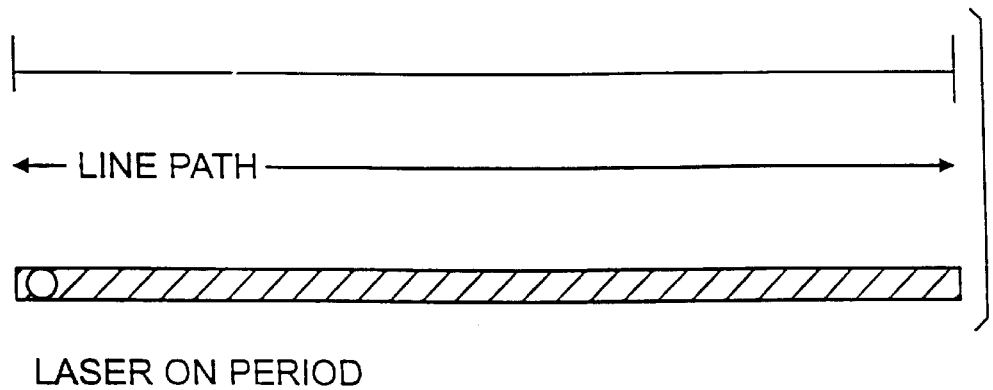
FIGS. 11a and 11b are schematic representations of laser beam scanning patterns as is known in the prior art.
Figure 11B:
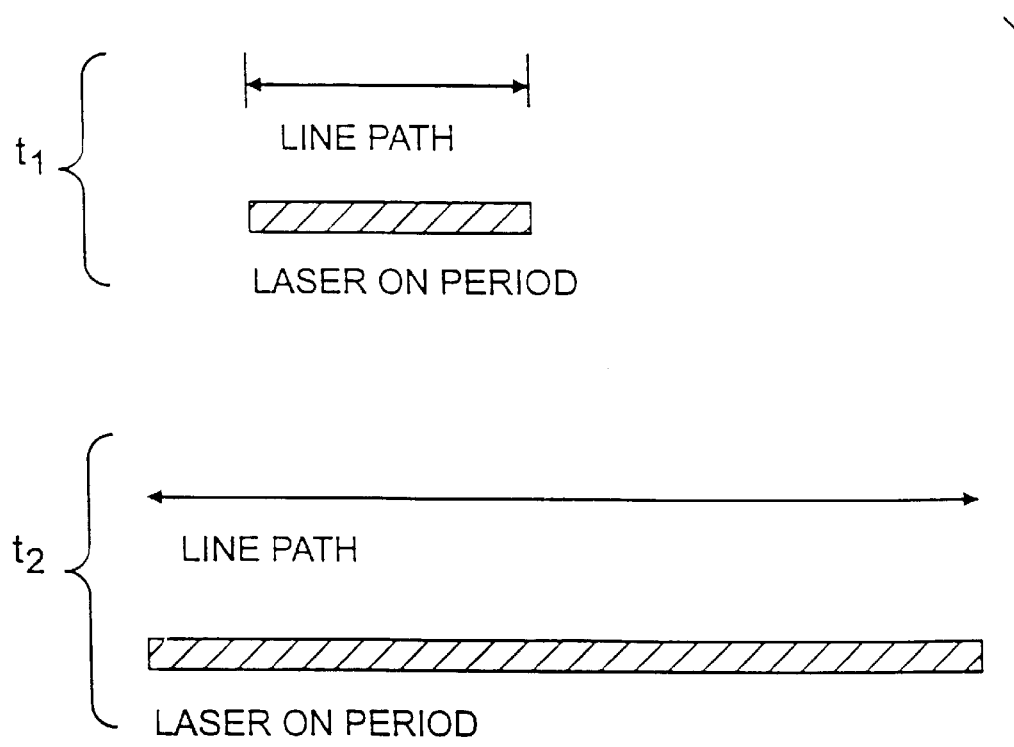
Figure 11C:
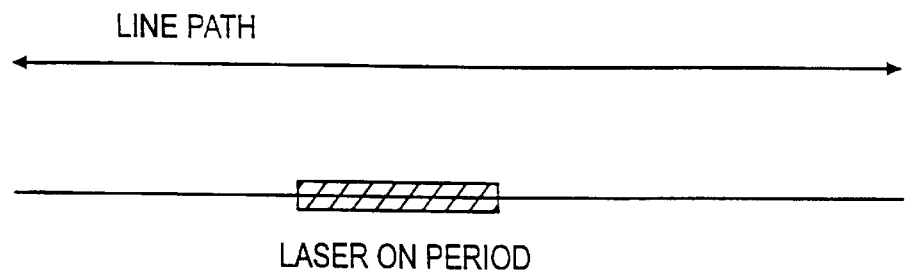
FIGS. 11c, 11d and 11e are schematic representations of laser beam pulsing patterns according to the present invention.
Figure 11D:
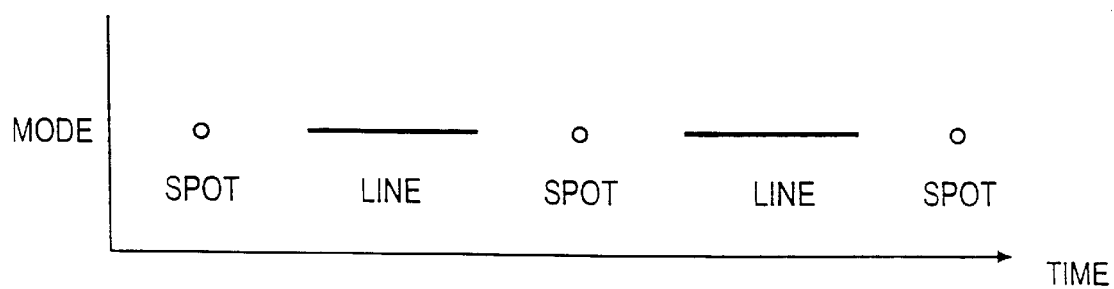
Figure 11E:
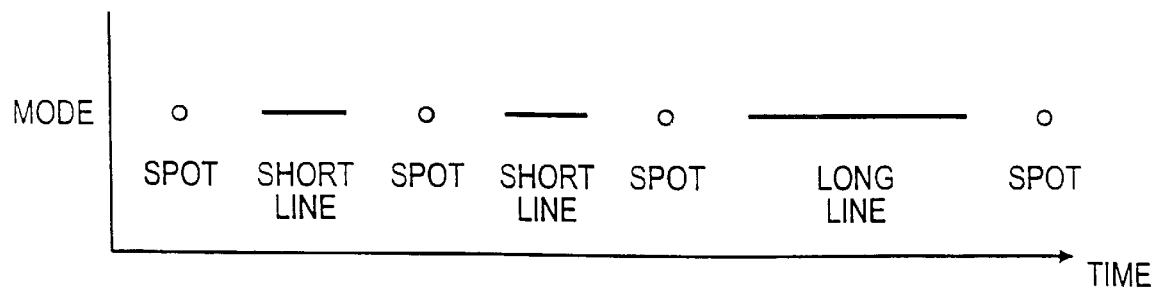

Turning to the Figures, FIGS. 11a and 11b are schematic representations of laser beam scanning patterns as is known in the prior art, wherein the laser is turned on for the entire duration of a scan. FIG. 11b is similar to that in U.S. Pat. No. 4,933,538, wherein $t_2$ is a later time than $t_1$. FIGS. 11c, 11d and 11e are schematic representations of laser beam pulsing patterns according to the present invention, wherein the laser is turned on for a fraction of the duration of a scan. In the preferred embodiment of FIG. 11c, the laser should be turned on in the middle of the scan time so the scanner user will see a short scan line that occurs every scan, instead of a long line every fourth scan. The short line will not appear to blink because thirty-six scans a second is above the frequency at which the human eye can perceive the flickering of a light. Flickering is quite visible with existing bar code readers that blink only nine times per second. The visually persistent short line serves as an aiming indicator useful for pointing a hand-held scanner at a targeted symbol prior to reading the symbol.

Some care should be taken to assume that the laser is turned on in the center of the scan in both scanning directions. If the blinking is controlled by a microprocessor, preferably the same one that is used for decoding, this is easily accomplished, as described below.

The scan element is typically a generally planar mirror movable by the scan element driver, which is typically a motor. A microprocessor control generates driving signals for energizing the motor to move the mirror at selected times and for desired durations. The light beam generated by the laser is directed at the mirror for reflection therefrom toward the targeted symbol to be read.

If the motor is not energized at a particular time, then the mirror will be stationary, and the light beam reflected off the stationary mirror will form a light "spot" on the targeted symbol. If the motor is energized for a short time duration, then the light beam reflected off the moving mirror will form a "short line" on the targeted symbol. If the motor is energized for a long time duration, then the light beam reflected off the moving mirror will form a "long line" on the targeted symbol.

In the embodiment of FIG. 11d, the spot and short line formations alternate cyclically during a scan period. The scan period commences and ends at opposite scan end-limiting positions. Thus, in FIG. 11d, there are three spots and two lines that are formed on the targeted symbol during each scan period. The laser is not turned on for the entire scan period as in prior art scanners, but instead, is turned on for a fraction of the scan period, thereby minimizing laser usage and, at the same time, providing a visually persistent aiming image on the targeted symbol. The successive aiming images provides an operator with multiple chances to aim the scanner at the symbol.

In the embodiment of FIG. 11e, a first spot is followed by a first short line and then, in order, by a second spot, by a second short line, by a third spot, by a long line, and finally by a fourth spot—all during a single scan period.

Other patterns of spots, short lines, and long lines are contemplated by this invention, the change or "blinking" between such light formations being particularly visually effective in accurate and rapid aiming.

If a scan motor, such as described in U.S. Pat. No. 5,212,627 and No. 5,367,151, that runs at its own natural frequency is used, the blinking must be synchronized to the motor because the motor frequency varies a little bit from one motor to another. These patents illustrate a preferred scan motor design for use with the present invention. This can be done using the start of scan (S.O.S.) signal that is provided by the motor drive circuitry. The S.O.S. signal is derived from a feedback signal that is provided by the motor drive circuitry. The S.O.S. signal is high when the motor is traveling in one direction and low when it is traveling in the other. High to Low or Low to High transitions occur when the motor changes direction at the end of each scan.

Figure 12A:
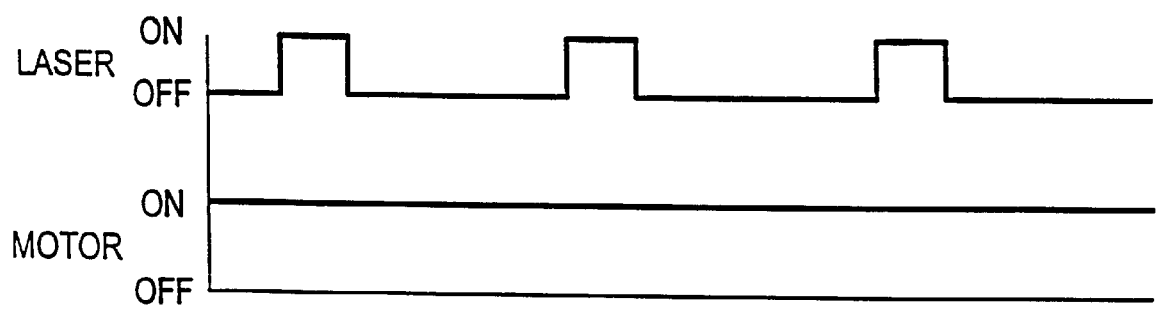
FIG. 12a is the timing diagram of one embodiment of a laser beam pulsing pattern corresponding to FIG. 11c.
Figure 12B:
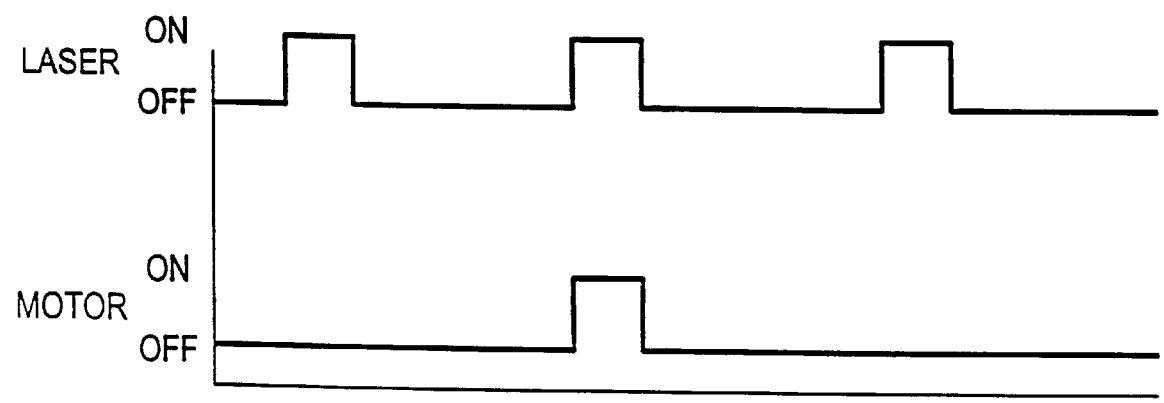
FIGS. 12b and 12c are timing diagrams of other embodiments of the laser beam pulsing pattern.
Figure 12C:
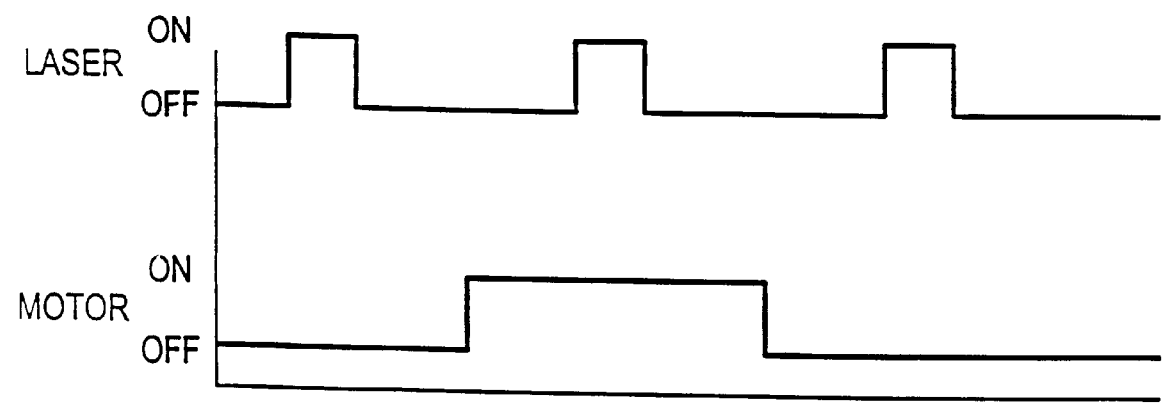

The laser turn-on can be controlled as set forth in the timing diagram of FIGS. 12a, 12b, and 12c. FIG. 12a is the timing diagram of the embodiment of a laser beam pulsing pattern corresponding to FIG. 11c; and FIGS. 12b and 12c are timing diagrams of alternative embodiments of the laser beam pulsing pattern. There are two types of timing errors that occur with the S.O.S. signal that should be taken into account when the S.O.S. signals are used to synchronize the laser blinking with the motor. The scans are not always symmetrical. Sometimes, for example, a motor takes twenty-seven milliseconds to scan left to right and twenty-eight milliseconds to scan right to left. In addition, the S.O.S. transitions typically do not correspond exactly with the time that the motor reverses direction. The S.O.S. transitions are typically delayed by about one or two milliseconds, depending on the sensing circuitry used.

These variations can be corrected by the microprocessor that controls the blinking as follows. When power is first applied to the scanner software, the decoder measures the scan time in each direction using the S.O.S. signal. For each direction, the decoder then calculates the value equal to three eighths of the measured scan time. The software routine then subtracts from this value the number of milliseconds by which the S.O.S. signal lags behind the actual turn around moment of the motor (typically 1–2 milliseconds). The signal lag number is determined from both the design of the particular type of motor and drive circuit being used. The signal lag will be approximately the same for all units of a given design.

When a start of scan transition occurs, the decoder waits the amount of time calculated above for the particular scan direction that is beginning; i.e., three eights of the measured scan time adjusted by the signal lag number. It then enables or turns on the laser for 25% of the measured scan time. This process is repeated every time the S.O.S. signal transitions, indicating the start of a new scan. Additional corrections for such things as slow response of the laser control circuitry can be made as necessary.

When all of the above is properly implemented, a scan line that is shorter than the full scan line will be visible that is centered with respect to the full scan line. This short line will be illuminated in both left to right and right to left scans. Although the laser is on for only 25% of the scan time, the visible scan line will be longer than 25% of the total scan line because the beam moves fastest in the center of the field. Experiments show that, in a typical scanning system with a resonant motor, the short scan line will be about 33% as wide as the full scan line, even though the laser is only on 25% of the time.

As described above, the present invention provides an optical scanner for reading bar code symbols on a target at a distance from the unit, including scanning element for generating a laser beam directed toward a target producing a pulsed relatively short image line on the target plane during a first time period and a substantially continuous wide angled laser beam that sweeps an entire symbol during a second time period for reading the symbol, and a detection element for receiving reflected light from such symbol to produce electrical signals corresponding to data represented by such symbol. The first and second time periods cyclically repeat during normal operational use.

This system is used to sense symbols as follows. When power is applied to the scanner it begins blinking the laser as described above. The user aims the visible shortened scan line at the symbol to be scanned, or if the scanner is stand mounted, positions the symbol under the visible shortened scan line.

When the scan line crosses a symbol or part of a symbol, the scanner can try to decode the symbol. If it fails, the laser can be turned on for the full scan time for the next few seconds or until a decode has occurred, at which time the short scan line returns. Multiple decodes of the same symbol can be prevented by programming the decoder not to decode the same symbol again until it is out of view for a while (typically 0.5 to 1 second).

This self triggering element has the following advantages. It does not appear to flicker because it blinks above the flicker perception frequency. It reduces the possibility of accidental triggering because it will only sense an object that looks like a bar code and only when it is centered in the scan field. It adds nothing to the circuit complexity and provides easier aiming than an invisible Infra-Red Sensor. It is usable for hand-held, fixed mounted, and wearable scanners. It is faster responding than blinking the laser one out of four scans because it can sense a symbol every scan, as opposed to every fourth scan.

Additional refinements can be used to further reduce power consumption. If necessary, the laser can be turned on for 25% of a scan time every other scan or even every third or fourth scan. This may result in visible flicker, but it might be acceptable in battery powered applications. In addition, the laser can be modulated at a high frequency during the sensing period. This can reduce its power consumption by half during its "On" time.

With these measures, the scanner (excluding decoder) can operate in its sensing mode at an average current of less than ten ma. This assumes that one of the commercially available visible laser diodes that operate at around thirty ma is used. If it is blinked on for 25% of every fourth scan its average current draw will be 1.875 ma. If it is modulated at 50% duty cycle during its "On" time, its average is 0.937 ma. Current resonant motors operate at 0.5 ma. Analog circuitry including amplifiers, digitizer, motor control, and laser regulator have been built that use less than 8 ma for a total of 9.43 ma (all at 3 to 5 volts).

Sometimes it is desirable to have a triggerless scanner that has no on-board decoder. Ideally, it should be compatible with existing decoders that are made for hand-held scanners. Current decoders contain software to control the laser, including any laser blinking. This makes it impossible to connect triggerless scanners or to use Intellistands with decoders. This problem can be avoided if an inexpensive microprocessor is used to control laser blinking and symbol sensing in a decoderless scanner.

There are small microprocessors available that can perform the blinking control as described above. The same microprocessor that blinks the laser can monitor the output of the digitizer during the time the laser is blinked on. If the microprocessor detects a sufficient number of elements being digitized to indicate that a symbol might be present, it can generate a simulated trigger pull signal that will signal the remote decoder that a symbol is present, just as if someone pulled a trigger. When the symbol is removed, the "trigger" will be automatically released.

If 25% is used as an appropriate blink duty cycle, higher duty cycles can of course be used if long lived lasers are used or lifetime requirements are modest. Scanners that never operate in hot environments can also operate at higher duty cycles. Lower duty cycles can be used to reduce power consumption or when the scanner is to operate in a hot environment.

The duty cycle can be user selectable by programming the reader, or by scanning special bar codes. This makes it easy to match the scanner to the environment.

FIG. 12d shows a timing diagram of an alternative embodiment of the laser beam pulsing pattern occurring in a decoderless scanner. In this embodiment, the laser and the driver, or motor, for moving the scanning element are separately controlled by a microprocessor. The microprocessor directly clips the scan beam by toggling a laser enable signal during a driver scan cycle. In this way, the laser turns on after the driver begins the scan cycle and turns off before the scan cycle ends.

Figure 13:
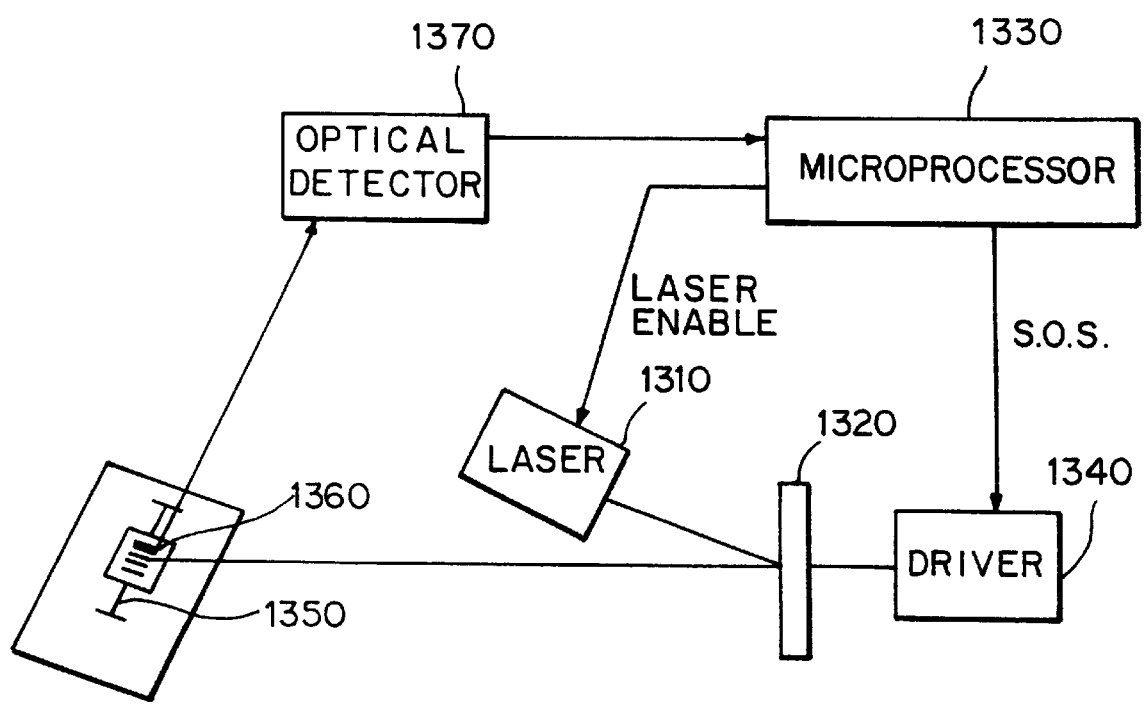
FIG. 13 is a block diagram of a system relating to the timing diagram of FIG. 12d.

FIG. 13 is a block diagram of one possible system relating to this alternative embodiment. Laser 1310 directs a light beam onto mirror 1320 in response to a laser enable signal from microprocessor 1330. Mirror 1320 deflects the light beam to provide a scanning beam. Driver 1340, which may be in the form of a motor, selectively oscillates mirror 1320 in response to an S.O.S. (start of scan) signal from microprocessor 1330, thereby causing the light beam to be scanned along a scan path 1350.

As shown in FIG. 12d, driver 1340 begins a scan cycle in response to each transition in the S.O.S. signal from microprocessor 1330. During a scan cycle, driver 1340 directs mirror 1320 along scan path 1350. After driver 1340 begins the scan cycle, microprocessor 1330 outputs a laser enable signal to turn on laser 1310 to emit the light beam for illuminating a target to be read, such as target 1360. Laser 1310 continues to emit the beam until microprocessor 1330 terminates the laser enable signal prior to the end of the scan cycle; i.e., before the next transition in the S.O.S. signal which causes driver 1340 to begin another scan cycle.

By this arrangement, microprocessor 1330 controls laser 1310 to emit the light beam for a portion of every scan path. When an S.O.S. signal transition occurs, microprocessor 1330 waits for a predetermined amount of time and then outputs the laser enable signal to turn on laser 1310. Microprocessor 1330 might control laser 1310 to emit the light beam for 25% of the scan time or about 33% of the full scan path, as described above.

Optical detector 1370 receives the light beam reflected by target 1360 and outputs a signal to a digitizer (not shown). The digitizer might be incorporated in microprocessor 1330 or might alternatively be a separate device. Microprocessor 1330 monitors the output of the digitizer during the time the laser is turned on. If microprocessor 1330 detects a sufficient number of bar code elements being digitized to indicate that a target might be present, it generates a simulated trigger pull signal to inform a remote decoder that a target is present. If the remote decoder decodes the entire target, then microprocessor 1330 continues the light beam pulsing pattern. If the remote decoder fails to decode the entire target, however, microprocessor 1330 turns on laser 1310 for the full scan time for the next few seconds or until a proper decode occurs, at which time microprocessor 1330 resumes the light beam pulsing pattern.

By clipping the beam electronically, average laser power is kept low. This may eliminate the requirement to lower the laser output power over the entire scan path. Additional refinements can be used to further reduce power consumption. For example, the laser can be turned on for 25% of the scan time every other scan or even every third or fourth scan.

Although the present invention has been described with respect to reading bar codes, including stacked, or two dimensional bar codes, such as Code 49, PDF 417 and similar symbologies, it is conceivable that the method and apparatus of the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the entire scanner to be fabricated on a single printed circuit board or as an integral module. Such a module can interchangeably be used as the laser scanning element for a variety of different types of data acquisition systems. For example, the module may be alternately used in a finger ring, hand-held or body-mounted scanner, a table top scanner attached to a flexible arm or mounting extending over the surface of the table or attached to the underside of the table top, or mounted as a subcomponent or subassembly of a more sophisticated data acquisition system. Control or data lines associated with such components may be connected to an electrical connector mounted on the edge or external surface of the module to enable the module to be electrically connected to a mating connector associated with other elements of a data acquisition system.

An individual module may have specific scanning or decoding characteristics associated with it, e.g. operability at a certain working distance, or operability with a specific symbology or printing density. The characteristics may also be defined through software or by the manual setting of control switches associated with the module. The user may also adapt the data acquisition system to scan different types of articles or the system may be adapted for different applications by interchanging modules on the data acquisition system through the use of a simple electrical connector.

The scanning module described above may also be implemented within a self-contained data acquisition system including one or more such components as a keyboard, display, printer, data storage, application software, and databases. Such a system may also include a communications interface to permit the data acquisition system to communicate with other components of a local area network or with a telephone exchange network, either through a modem or an ISDN interface, or by low power radio broadcast from the portable terminal to a portable or stationary receiver or base station.

It will be understood that each of the features described above, or two or more together, may find a useful application in other types of scanners and bar code readers differing from the types described above.

Figure 14:
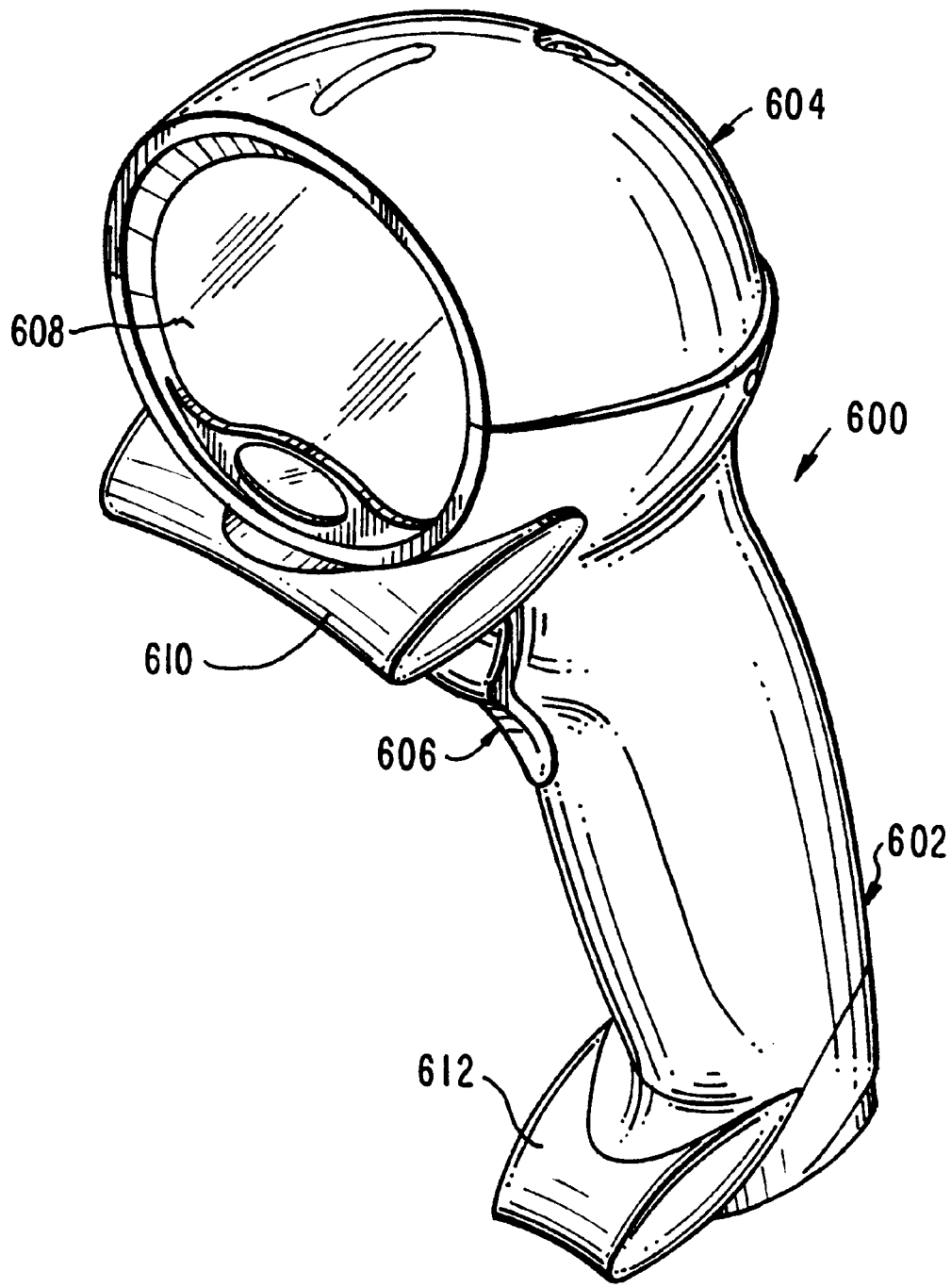
FIG. 14 is a perspective view of a portable scanner.

For example, a hand-held scanner 600 is depicted in FIG. 14. Scanner 600 includes a handle 602 for gripping by a user, a body 604 supported by the handle, a trigger 606, either of the single-position or the double-position type, a window 608 through which the laser beam and/or light reflected from a bar code symbol pass, and a pair of support feet 610, 612 for supporting the scanner when the scanner is laid on a countertop or like support surface.

Figure 15:
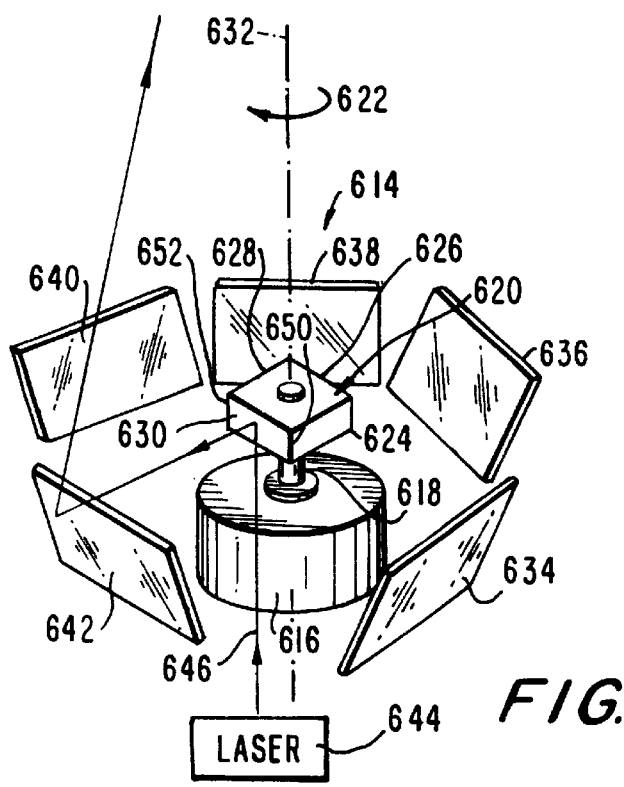
FIG. 15 is a perspective view of a scan line generator mounted in the scanner of FIG. 14.

An omni-directional scan line pattern generator 614, as depicted in FIG. 15, is mounted within the scanner 600 and is operative for generating an omnidirectional, multiple, scan line pattern or, when converted as described below, a single line scan pattern. The generator 614 includes a drive motor 616 having an output shaft 618 on which a mirrored element or polygon 620 is mounted for joint rotation in the circumferential direction of the arrow 622 about axis of rotation 632. The element 620 can have any number of mirrored sides. In the preferred embodiment, the element 620 is a square having four mirrored sides or inner mirrors 624, 626, 628, 630. Each inner mirror is a generally planar, front surface reflecting mirror that is slightly inclined relative to the axis 632. The inner mirrors are preferably of the same size and are equiangularly arranged around the axis 632.

The generator 614 further includes a plurality of outer, beam-folding or crown mirrors 634, 636, 638, 640, 642, which are also equiangularly arranged around the axis 632 in an annulus surrounding the motor 616. Any number of outer mirrors may be employed. In the preferred embodiment, there are five outer mirrors. Each outer mirror is inclined relative to the axis 632.

A light source, preferably a semiconductor laser 644, is mounted within the scanner and emits a light beam 646 to the element 620 for successive reflection off the inner mirrors during rotation of the element. Each complete revolution of the element generates, in the preferred embodiment, four scan lines in generally mutual parallelism. The laser beam 646 may be directed through an optical train prior to reaching the polygon, but this has been omitted from FIG. 15 for the sake of clarifying the drawing.

The laser beams reflected off the inner mirrors are, in turn, successively directed to, and reflected from, the outer mirrors through the window 608 toward a bar code symbol to be read. Each outer mirror generates a set of the scan lines. The different angles of inclination of the outer mirrors generates intersecting sets of the scan lines. In the preferred embodiment, there are five intersecting sets of four scan lines each. The resultant omnidirectional, multiple scan line pattern provides a very effective coverage over the symbol with a high likelihood that at least one of the twenty scan lines will extend across all the bars and spaces of the symbol to be read.

In accordance with this invention, it is desired to convert this omni-directional, multiple line scan pattern to a single scan line by intermittently operating and de-energizing the light source 644. The single scan line is useful as an aiming beam or, in some cases, can be used as a scanning beam to read the symbol. As an aiming beam, the single scan line has sufficient visibility to be seen by the user.

Figure 16:
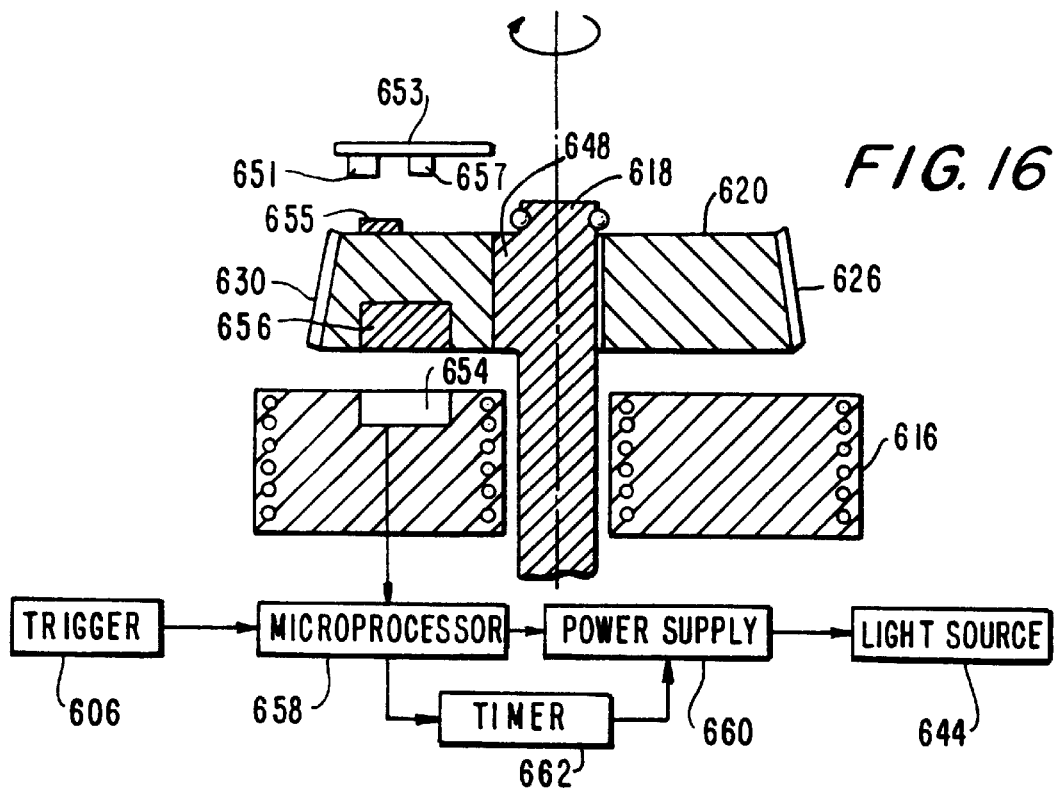
FIG. 16 is a part-sectional, part diagrammatic view of part of the generator of FIG. 15 and its control circuitry.

The intermittent operation of the light source can be achieved in many different ways. It is currently preferred to key the position of the element 620 on the motor shaft 618 so that only one of the inner mirrors, e.g., inner mirror 630, and only one of the outer mirrors, e.g., outer mirror 642, are employed to generate the single scan line. The motor shaft 618 is provided, as shown in FIG. 16, with an axial projection or spline 648 that receives, and fits into, a complementary axial groove within the element, thereby not only enabling both the shaft and the element to rotate together, but also to determine a fixed angular position that serves as a known reference position from which the position of a leading edge 650 of the inner mirror 630 is determined. The light source 644 is turned on when the light beam 646 passes the leading edge 650, and is turned off automatically when the light beam passes the trailing edge 652 of the inner mirror 630. The light source 644 is maintained off until the light beam 646 again passes the leading edge 650.

In the preferred embodiment, the element is rotated at a given constant speed of 3600 rpm±50 rpm, and completes one revolution in a known total time. The time it takes for the light beam to traverse the inner mirror 630 is about one-twentieth of the total time that it takes for the polygon to make a complete revolution. Hence, a timer can be used to automatically shut down the light source after a known time after the leading edge 650 is detected.

The leading edge 650 can be detected by a Hall effect sensor 654 mounted within the motor and cooperating with a magnet 656 mounted in the element. Each time the magnet 656 passes the sensor 654, an electrical pulse signal is generated. This pulse signal is conducted to a control circuit including a microprocessor 658 that generates an output control signal to energize a power supply 660 that supplies power to the light source 644. At the same time, a timer 662 is actuated and, after the elapse of a predetermined time, the power supply 660 is de-energized, and the light source is turned off.

Rather than using a Hall effect sensor, a light absorbing black stripe 631 can be applied over the leading edge 650. During rotation of the element 620, the moving light beam 646 is swept across the symbol, and light is reflected from the symbol. Some of the reflected light re-enters the scanner through the window 608 and is detected by a system photodetector. The system photodetector generates an analog signal corresponding to the symbol being swept. This analog system is digitized and decoded as is well known in this art. Upon detection by the system photodetector of an abrupt drop in the intensity of the reflected light, the black stripe 631 and the leading edge 630 are reliably detected. As before, the detection of the leading edge is employed to cause the microprocessor 658 to energize the laser power supply 660.

Still another way of detecting the leading edge is to mount an auxiliary light source, such as a light emitting diode 651 on a printed circuit board 653 situated above the element 620. A highly reflective dot 655 is applied on an upper surface of the element 620, and is operative to reflect light emitted by the diode 651 to a photodiode 657 located on the circuit board 653 alongside the diode 651. The photodetector 657 detects the presence of the dot 655 and generates an output pulse signal which precisely locates the position of the leading edge 650 during each rotation of the element 620.

Still another technique for locating the leading edge 650 is to use a counter. The counter begins to count at the time that the leading edge passes a known reference point on the shaft, and stops counting at a known time thereafter. The output of the counter is used to control the microprocessor and, in turn, the laser power supply and the laser source.

The scanner 600 is operated in any one of several different modes. In a first mode, the generator 614 is automatically and constantly operating to generate the multiple line, omni-directional scan pattern described above. In order to change the scan pattern to a single scan line, the user manually depresses the trigger 606, after which the microprocessor controls the power supply 660 to energize the laser source 644 only for so long as the laser beam 646 is traversing the inner mirror 630.

In a second mode, the user manually depresses the trigger 606 once to a first position to initiate the generation of the multiple line, omni-directional scan pattern. In order to change the scan pattern to a single scan line, the user manually depresses the trigger 606 either a second time, or to a second position.

In a third mode of operation, the generator 614 is automatically and constantly operating to generate the multiple line, omni-directional scan pattern for as long as the scanner 600 is mounted on a stand. In order to change the scan pattern to a single scan line, the scanner 600 is removed from the stand and the trigger 606 is manually depressed.

Any one of these three modes is selectable in advance by the user. The detection of the scanner 600 in the stand in the third mode is conveniently accomplished by a Hall effect sensor and a magnet respectively mounted in the stand and the scanner. The mounting of the scanner 600 on the stand causes a signal to be generated. This signal is then used to tell the microprocessor that the scanner is on the stand.

While the invention has been illustrated and described as embodied in it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

We claim:

1. An arrangement for electro-optically reading indicia, comprising:
   a) an energizable light source for emitting a light beam when energized;
   b) a pattern generator for moving the light beam in a multiple line, scan pattern across an indicium during a scan period in a first mode of operation; and
   c) a controller for converting the multiple line, scan pattern to a single scan line by intermittently operating and energizing the light source to emit the light beam for a working time period which is less than, and a fraction of, the scan period to cause the pattern generator to generate the single scan line across the indicium in a second mode of operation.

2. The arrangement of claim 1, wherein the light source is a semiconductor laser.

3. The arrangement of claim 1, wherein the pattern generator includes a mirrored element having a plurality of inner mirrors, a drive for rotating the element about an axis of rotation, and a plurality of outer mirrors arranged about the axis and spaced radially from the inner mirrors.

4. The arrangement of claim 3, wherein the inner mirrors are equidistantly arranged around the axis, and wherein the outer mirrors are equidistantly arranged around the axis.

5. The arrangement of claim 3, wherein the inner mirrors of the mirrored element are successively impinged by the light beam during rotation; and wherein one of the inner mirrors has a leading edge and a trailing edge as considered along the direction of rotation; and wherein the controller is operative for energizing the light source as the light beam impinges the leading edge, and for de-energizing the light source as the light beam impinges the trailing edge of said one mirror during rotation in the second mode of operation.

6. The arrangement of claim 5; and further comprising an edge detector for detecting the leading edge of said one mirror during rotation in the second mode of operation.

7. The arrangement of claim 6, wherein the edge detector includes a light-absorbing marker situated on the leading edge of said one mirror.

8. The arrangement of claim 6, wherein the edge detector includes a light-reflective marker situated on the element.

9. The arrangement of claim 6, wherein the drive includes a motor having a drive shaft, and wherein the edge detector includes a spline on the shaft and keyed in a predetermined position to the element.

10. The arrangement of claim 6, wherein the edge detector includes a permanent magnet on the element for joint rotation therewith, and a Hall effect sensor adjacent the magnet and operative for generating an output control signal corresponding to the location of the leading edge as the magnet moves past the sensor.

11. The arrangement of claim 1; and further comprising a housing in which the light source and the pattern generator are mounted; and further comprising a mode selector for selecting the mode of operation.

12. The arrangement of claim 11, wherein the pattern generator automatically operates in the first mode, and wherein the mode selector includes a manually depressable trigger on the housing and operative, when depressed, to actuate the controller to convert the pattern generator to operate in the second mode.

13. The arrangement of claim 11, wherein the mode selector includes a two-position, manually depressable trigger on the housing and operative, when depressed to a first position, to actuate the pattern generator to operate in the first mode, and further operative, when depressed to a second position, to actuate the pattern generator to operate in the second mode.

14. The arrangement of claim 11, wherein the housing has a handle for handheld use, and wherein the mode selector actuates the pattern generator to operate in the first mode when the housing is not hand-held, and includes a manually depressable trigger on the housing and operative, when hand-held and depressed, to actuate the controller to convert the pattern generator to operate in the second mode.

15. An arrangement for electro-optically reading bar code symbols, comprising:

a) a housing having a handle for hand-held use;

b) an energizable laser in the housing for emitting a laser beam when energized;

c) a pattern generator in the housing, for moving the laser beam in an omnidirectional scan pattern comprised of a plurality of intersecting sets of a plurality of scan lines across a symbol during a scan period in a first mode of operation;

d) a controller in the housing for converting the plurality of scan lines to a single scan line by intermittently operating and energizing the laser to emit the laser beam for a working time period which is less than, and a fraction of, the scan period to cause the pattern generator to generate the single scan line across the symbol in a second mode of operation; and e) a mode selector for enabling a user to change the mode of operation of the pattern generator.

16. The arrangement of claim 15, wherein the selector includes a manually depressable switch on the housing and operative, when depressed, to convert the operation from the first mode to the second mode.

17. A method of electro-optically reading indicia, comprising the steps of:

a) emitting a light beam from a light source;

b) moving the light beam in a multiple line, scan pattern across an indicium during a scan period in a first mode of operation; and c) converting the multiple line, scan pattern to a single scan line by intermittently operating and energizing the light source to emit the light beam for a working time period which is less than, and a fraction of, the scan period to generate the single scan line across the indicium in a second mode of operation.

18. The method of claim 17, wherein the moving step is performed by rotating a succession of inner mirrors past the light beam about an axis of rotation, one of the inner mirrors having a leading edge and a trailing edge as considered along the direction of rotation; and wherein the intermittently energizing step is performed by energizing the light source as the light beam impinges and passes by the leading edge, and by de-energizing the light source as the light beam impinges and passes by the trailing edge of said one mirror during rotation in the second mode of operation.

19. The method of claim 18; and further comprising the step of detecting the leading edge of said one mirror during rotation in the second mode of operation.

20. The method of claim 17; and further comprising the step of selecting the mode of operation.

* * * * *